Nov. 29, 1960   S. LOEWE ET AL   2,962,239
BRAKING DEVICE FOR MAGNETIC RECORDERS
Filed Oct. 15, 1956
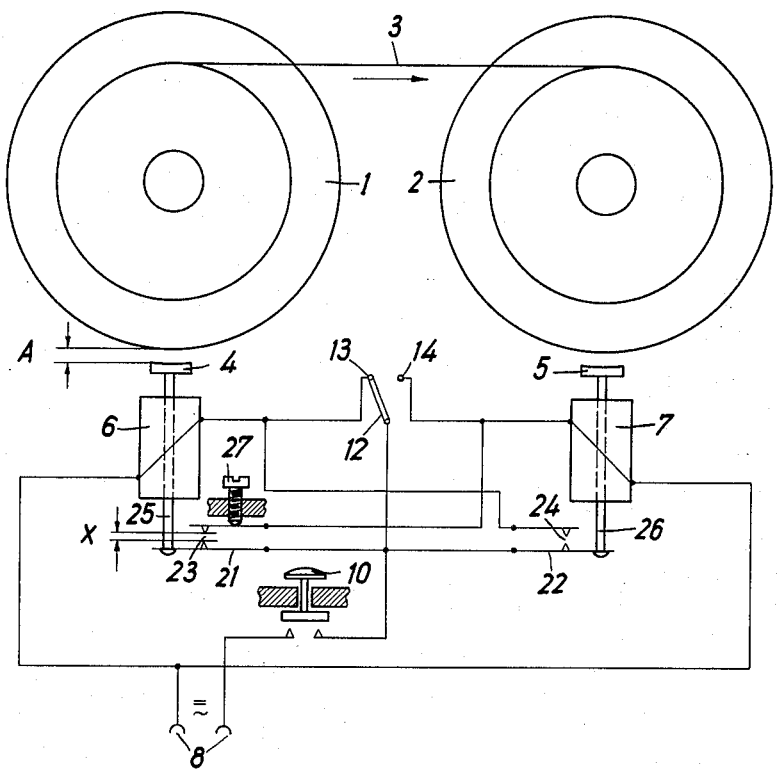
Inventors:
Siegmund Loewe
Wolfgang Leinhos United States Patent Office 2,962,239
Patented Nov. 29, 1960

2,962,239
BRAKING DEVICE FOR MAGNETIC RECORDERS

Siegmund Loewe, 68 Ridge Road, Yonkers 5, N.Y., and Wolfgang Leinhose, Berlin-Friedenau, Germany; said Leinhose assignor to said Loewe Filed Oct. 15, 1956, Ser. No. 616,105

Claims priority, application Germany Oct. 21, 1955

2 Claims. (Cl. 242—55.12)

With arrangements in which tape—film or wire—winds off between two reels, in particular with magnetic tape recorders, it is necessary to provide a braking device which allows the immediate stopping of the tape should this be required. Such braking devices are especially necessary if the reel drive of the recorder can be optionally adjusted to high speed which is necessary for the quick finding of a predetermined point of the tape.

It has been already suggested to use a braking device for the arrangements in question by means of which the braking process on the two moving reels, i.e. the wound-on and wound-off reels is carried out at different times or with different braking forces. This measure prevents a loop formation of the tape between the two reels and a too high tape tension when a quick braking action is made, in particular from high speed. These two disadvantages may occur if, as previously was the case, the two reels are braked simultaneously or if no attention at all is paid to the sequence of the various braking operations.

It is an object of the present invention to disclose a further improvement for such braking device. In order to realize a definite sequence in the braking effect on the wound-on and wound-off reel, i.e. in order to provide that the wound-on reel is braked at a fixed short time interval after the wound-off reel has been braked, the braking arrangement is fitted, in accordance with the present invention, with a device which is controlled by a movement taking place at the commencement of the braking operation.

This device controlled by the braking movement consists of one or more pairs of electrical contacts, in particular provided with a spring action, which lie in the circuits of the electrically operated brakes. For this purpose, the brakes are of electro-magnetic construction and the brake shoes are arranged on movable armatures of the electromagnets. The supply circuits for these braking magnets contain, apart from the controlled pairs of contacts, a main switch for bringing about the actual braking operation and also, if necessary, a switch which makes the sequence of the activated braking operation dependent on the respective direction of the tape movement. This last-mentioned switch is best coupled to the other means of the recorder which serve to switch over the running direction of the tape.

The operation of the controlled device, consisting of pairs of contacts, for keeping a definite sequence or a definite time interval between the braking operations on each of the two reels, can be carried out by the following means.

This means consists in operating the controlled device, that is, in particular the control contacts, in direct or indirect dependence on the movement of the brake shoes or the armature of the braking magnets connected with these. In this case, the brake shoes or the magnet armatures coupled with them are provided with a shoulder piece or an extension piece which operates the controlled device, e.g. by resting on a contact spring belonging to the pair of contacts.

The principle of the invention and further details of it are explained by means of the accompanying drawing which shows a complete arrangement schematically represented, of the mechanical and electrical parts essential for the invention, the complete arrangement being shown in a magnetic tape recorder.

The pairs of contacts 23 and 24 which are co-ordinated with the two braking circuits are operated by the mechanical movement of the braking parts themselves. These are embodied by the braking shoes 4 and 5 and the braking magnets 6 and 7. In the above-mentioned example, the armatures of the two braking magnets have an extension piece or a shoulder piece 25 or 26 and these shoulder pieces rest on a spring contact 21 or 22 of the pairs of contacts 23, 24.

The effect is that upon operation of the key 10 and in the corresponding position of the switch 12, 13, 14 the braking magnet 6 for reel 1 is first connected. The braking movement of the braking shoe 4 and the shoulder piece 25 then effects a contact connection at 23 and thus a connection of the braking magnet 7 which brakes the reel 2. The analogous process can be realized in reversed sequence when the direction of the tape is reversed, i.e. with the tongue-shaped contact 12 resting on contact 14.

With the described arrangement, the delay interval between the first and second braking operation can be made adjustable, if desired. An example of this is shown in connection with the pair of contacts 23 in the form of an adjusting screw 27 by means of which the distance X between the two contact springs at rest can be adjusted as desired. A corresponding adjustment is then also provided on the pair of contacts 24.

In the basic arrangement of the drawing, the distance X of the pairs of contacts at rest must always be kept smaller than the distance at rest A between the brake shoe and the braking surface since otherwise it is not possible to make an effective contact. However, with such arrangements, in order to be able to make, if necessary, the contact distance at rest X large and thereby to increase the delay interval between the first and second braking operation, i.e. to bring about the second braking operation only when the mechanical braking of the first operation has already commenced, the following additional measure can be used.

A spring device effective in the braking direction is provided between the braking shoe and that part of the armature which is connected with the spring contact to be moved, for example the shoulder piece 25. By means of this, it is possible to shift the armature of the magnet coil 6 in the direction of braking even when the braking shoe 4 already rests on the braking surface of the reel carrier.

Finally, a variation of the example described above is possible in that the release of the second braking operation by the first one is carried out mechanically instead of electrically. In this case, the braking shoe 4 or its shoulder piece 25 shown in the drawing can effect the second braking operation via suitably formed rods. This is best made by release of a locking lever of the braking device which, in other respects, is constructed with a spring action.

What we claim is:

1. In a magnetic tape recorder a brake arrangement for a wound-off and a wound-on tape reel containing one brake for each tape reel, and a circuit consisting of a source of power, a key, a change-over switch, and two pairs of electrical contact tongues, each of said brakes consisting of an electromagnetic coil, a movable electromagnetic armature and a brake shoe secured to said armature, each of said electromagnetic coils connected with said circuit, each pair of said contact tongues being located adjacent one of said armatures so that corresponding to the position of said changeover switch one of said pair of contact tongues is closed by its adjacent armature upon actuation of one of said brakes to connect the electromagnetic coil of the other armature with the source of power to sequentially apply the other brake.

2. In an arrangement according to claim 1, further including one adjustable screw touching one of the contacts of one of said pairs of electrical contact tongues and serving to adjust the distance between said tongues.

References Cited in the file of this patent

UNITED STATES PATENTS

| | | |
|---|---|---|
| 1,861,824 | Smith | June 7, 1932 |
| 2,626,760 | Chick | Jan. 27, 1953 |
| 2,659,541 | Camras | Nov. 17, 1953 |
| 2,686,637 | Dashiell et al. | Aug. 17, 1954 |
| 2,712,448 | Schroter | July 5, 1955 |